United States Patent
Driesen et al.

(10) Patent No.: US 8,479,187 B2
(45) Date of Patent: Jul. 2, 2013

(54) ADAPTIVE SWITCH INSTALLER

(75) Inventors: Volker Driesen, Walldorf (DE);
Christiane Valentin, Malsch (DE);
Andrey Engelko, Karlsruhe (DE)

(73) Assignee: SAP AG, Walldorf (DE)

( * ) Notice: Subject to any disclaimer, the term of this patent is extended or adjusted under 35 U.S.C. 154(b) by 982 days.

(21) Appl. No.: 12/326,863

(22) Filed: Dec. 2, 2008

(65) Prior Publication Data
US 2010/0138821 A1   Jun. 3, 2010

(51) Int. Cl.
*G06F 9/445* (2006.01)
(52) U.S. Cl.
USPC .......................................... 717/168; 718/104
(58) Field of Classification Search
USPC .......................................................... 717/168
See application file for complete search history.

(56) References Cited

U.S. PATENT DOCUMENTS

| | | | |
|---|---|---|---|
| 7,117,229 B2 * | 10/2006 | Marshall et al. ...................... 1/1 |
| 7,917,475 B2 * | 3/2011 | D'Souza et al. ............. 707/656 |
| 2003/0130985 A1 * | 7/2003 | Driesen et al. .................... 707/1 |
| 2005/0251523 A1 * | 11/2005 | Rajamani et al. ............ 707/100 |
| 2007/0180289 A1 * | 8/2007 | Chai et al. ......................... 714/4 |
| 2008/0028436 A1 * | 1/2008 | Hannel et al. .................... 726/1 |
| 2008/0098046 A1 * | 4/2008 | Alpern et al. ................. 707/203 |
| 2008/0256528 A1 * | 10/2008 | Waitzmann et al. .......... 717/172 |
| 2008/0276234 A1 * | 11/2008 | Taylor et al. .................. 717/177 |
| 2010/0088281 A1 * | 4/2010 | Driesen et al. ................ 707/641 |

OTHER PUBLICATIONS

Oracle8i Utilites Chapter 2, Oracle Corporation (1999), retrieved from http://www.csee.umbc.edu/portal/help/oracle8/server.815/a67792/ch02.htm on Aug. 28 2012.*

* cited by examiner

*Primary Examiner* — Don Wong
*Assistant Examiner* — Theodore Hebert
(74) *Attorney, Agent, or Firm* — Mintz Levin Cohn Ferris Glovsky and Popeo, P.C.

(57) ABSTRACT

The subject matter disclosed herein provides methods and apparatus, including computer program products, for upgrading software. In one aspect there is provided a method. The method may include copying a source application server to form a shadow application server, the copying including copying a repository table and a customizing table to form a shadow repository table and a shadow customizing table. Moreover, the upgrade may be implemented at the shadow application server. The upgrade may be applied to a first synonym of the shadow repository table and a second synonym of the shadow customizing table. The first synonym may enable the shadow application server to connect to the shadow repository table, when the upgrade is being implemented. The second synonym may enable the shadow application server to connect to the shadow customizing table, when the upgrade is being implemented. The method may also include switching to the upgrade by renaming the shadow repository table and the shadow customizing table to identifiers corresponding to the repository table and customizing table of the source application server. Related systems, apparatus, methods, and/or articles are also described.

18 Claims, 5 Drawing Sheets

ADAPTIVE SWITCH INSTALLER

FIELD

This disclosure relates generally to data processing and, more particularly, to reducing downtime associated with maintaining software.

BACKGROUND

Databases are often provided to facilitate the running of software applications in a computing-based environment. Examples of software applications include operating system software, and programs that run on an operating system. Databases in computing environments also store data. Such data may include data to configure programs, as well as application data that are generated during, for example, productive use, or operation of an application.

Various arrangements may be provided to facilitate access to a database. For example, networked and other database sharing environments permit multiple users to share a database. Such arrangements facilitate client-server solutions for business and other types of database user environments. By way of example, R/3 is a client-server solution provided by SAP® AG. An R/3 system typically includes a number of software applications or modules that are installed in an environment comprising a database and an application server connected to the database. The application server of an R/3 system can perform numerous functions, including executing programs stored in the database.

From time to time, a database may need to be upgraded in view of various factors. For instance, modifications or enhancements to applications and/or data by a software vendor may require that prior releases running on a database be upgraded to a new release. Additionally, revisions to correct programming errors or bugs may require that a database be upgraded with a new release.

When upgrading a database, there are a number of technical problems to be addressed. For example, most database users depend on the availability of a database, including the applications and data stored therein. In some cases, the required availability of a database may dictate that interruptions to productive operation be minimized when performing an upgrade. By way of example, a database user may require approximately, continuous availability of a database (e.g., availability 12-24 hours a day, 5-7 days a week). Therefore, extended database interruptions may be unacceptable and minimizing the downtime for a database upgrade can become problematic, especially when attempting to upgrade a large database using conventional techniques.

Other issues may exist when upgrading a database. For instance, many database environments require that certain modifications, add-ons, support packages, application data, customizing data, and/or other items be maintained when installing a new release. Making adjustments to import or maintain such items can dramatically extend the downtime required for performing an upgrade and, in some cases, create failure or disaster risks for the database. Conventional methods for upgrading a database also suffer other drawbacks, such as being technology dependent or restrictive as to the upgrade release (i.e., dependent on the prior release(s) installed in the database).

SUMMARY

The subject matter disclosed herein provides methods and apparatus, including computer program products, for providing software updates.

In one aspect there is provided a method. The subject matter disclosed herein provides methods and apparatus, including computer program products, for upgrading software. In one aspect there is provided a method. The method may include copying a source application server to form a shadow application server, the copying including copying a repository table and a customizing table to form a shadow repository table and a shadow repository table. Moreover, the upgrade may be implemented at the shadow application server. The upgrade may be applied to a first synonym of the shadow repository table and a second synonym of the shadow customizing table. The first synonym may enable the shadow application server to connect to the shadow repository table, when the upgrade is being implemented. The second synonym may enable the shadow application server to connect to the shadow customizing table, when the upgrade is being implemented. The method may also include switching to the upgrade by renaming the shadow repository table and the shadow customizing table to identifiers corresponding to the repository table and customizing table of the source application server.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWING

These and other aspects will now be described in detail with reference to the following drawings.

Like reference symbols in the various drawings indicate like elements.

DETAILED DESCRIPTION

Figure 1:
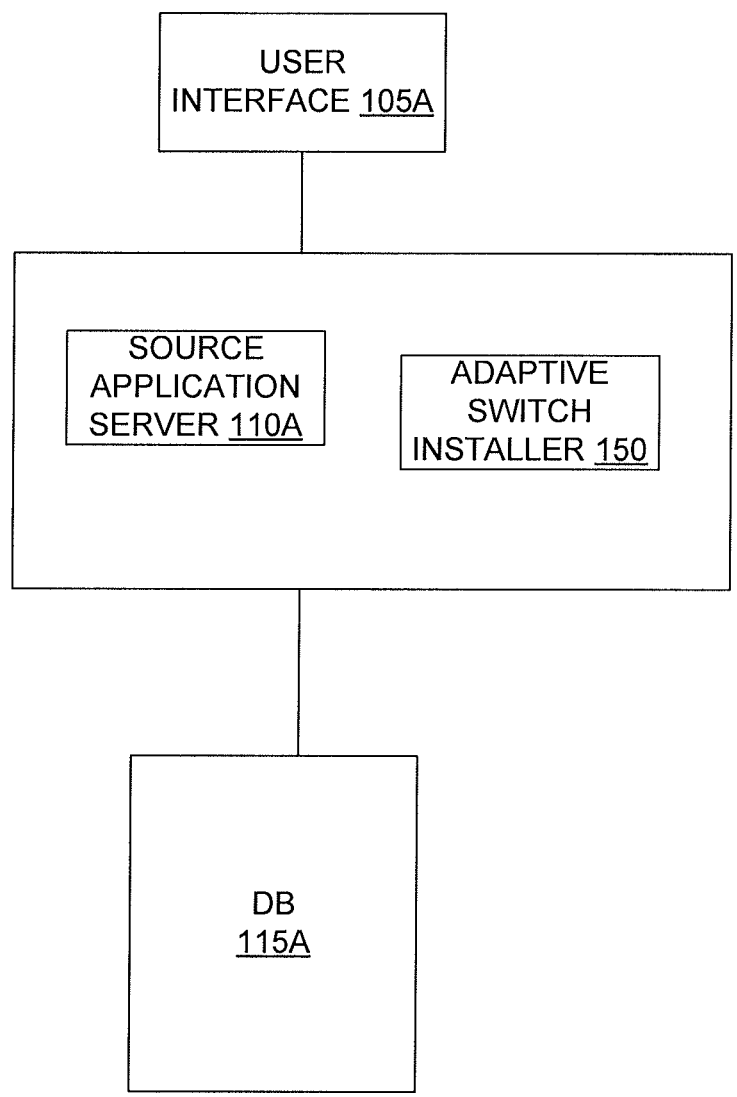
FIG. 1 illustrates a system including an adaptive switch installer 150.

FIG. 1 depicts a system 100. System 100 includes a user interface 105A, an application server, such as source application server 110A, an adaptive switch installer 150, and a database 115A, all of which are coupled by a communication mechanism, such as an Internet, or an intranet.

User interface 105A may be implemented as any type of interface mechanism for a user, such as a web browser, a client, a smart client, and any other presentation or interface mechanism. Database 115A (labeled "DB") may be implemented as any type of database. The source application server 110A represents the application server in production (e.g., which is being upgraded). The phrase "application server" refers to a server program executed in a processor, such as a computer, blade, and the like, that provides business logic for an application program.

The adaptive switch installer 150 may be implemented as a program on a processor. As further described below, the adaptive switch installer 150 is used to install an upgrade to the source application server 110A. The adaptive switch installer 150 may control a software upgrade using the processes described herein (e.g., processes 200 and 400). Unlike an upgrade procedure designed and optimized for the case where a new release is shipped in its entirety (e.g., a complete set of tables including a complete software upgrade is deployed and copied to the source application server 110A), the adaptive switch installer 150 is configured for the case when only the changes (e.g., deltas between the new release of the software and a previous version of that software) of the software product are shipped (e.g., either as a support package (focusing on the shipment of bug fixes) or on the shipment of enhancement packages (focusing on functional extensions)).

For example, rather than deploy an entire upgrade package, a delta upgrade package is deployed (e.g., implemented). This delta upgrade software package includes table structure definitions for customizing tables and application tables, content for repository tables, and content for the customizing tables. Rather than deploy all of the tables as part of the upgrade, adaptive switch installer 150 clones the repository tables and customizing tables used by the source application server 110A. The adaptive switch installer 150 then creates synonyms for the cloned repository tables and customizing tables. The synonyms are used with another, shadow schema, which may be accessed by the source application server 110A and/or the shadow application server 110B. Through the shadow schema (which represents a link to the cloned tables at the original schema), the synonyms of repository tables and customizing tables are then configured with the delta upgrade package. After the upgrade, the cloned repository and customizing tables may be renamed, so that the original source application server recognizes the tables (e.g., by renaming the tables to have the same names as the original tables used by the source application server). The database schema refers to a collection of database objects, where database tables and views are managed. For example, when a database user is created in a database management system (DBMS), a database schema of the same name is also generated. This type of database schema is thus a collection of database objects where tables and views are managed. The schema and the objects belong to the user. Other users can be assigned read-write authorizations for the schema and for the tables and views.

Moreover, in some implementations, the adaptive switch installer 150 may be used to deploy, as part of the delta upgrade software package, large delta archives (e.g., for so-called "enhancement packages" or large sets of so-called "support packages") in an efficient manner with short downtime. In some implementations, the adaptive switch installer 150 may offer one or more of the following advantages: short downtime; having the option to deploy a set of packages (e.g., selectively install a delta versus installing an entire software system); adjustments to data during the upgrade limited to those aspects associated with the delta; maintaining a roll-back capability; maintaining the productive system in operation until the delta of the upgrade is deployed and ready for productive use. For example, given about 500 repository tables, about 8000 customizing tables, and 30000-60000 application tables, the volume in the repository tables is about 40 gigabytes (GB), in the customizing tables about 10 GB, and in the application tables about several Terabytes. Moreover, the size of the delta upgrade package may be about 100 megabytes to several gigabytes. In this example, the adaptive switch installer 150 may implement the delta upgrade package in about 4 hours rather than about 20 hours, when compared to a traditional copy of all of the tables of the upgrade.

Figure 2:
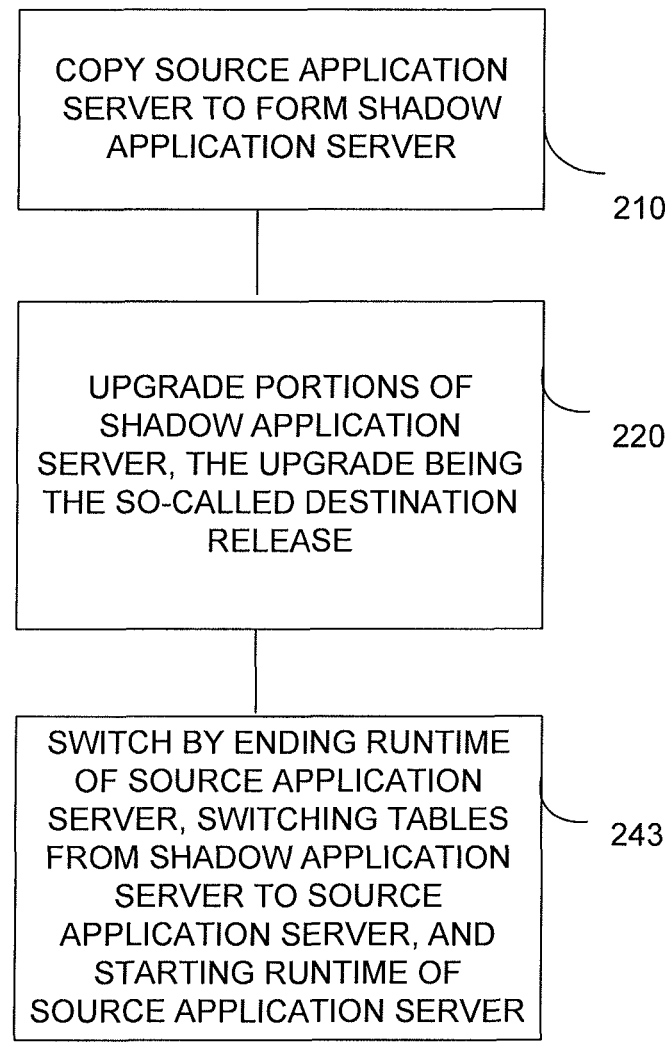
FIG. 2 illustrates a process for handling software updates.

FIG. 2 depicts a process 200 used by adaptive switch installer 150 to upgrade the source application server 110A. The description of process 200 will also refer to FIGS. 1 and 3.

At 210, adaptive switch installer 150 copies source application server 110A to form another application server, such as shadow application server 110B. The shadow application server 110B is the application server, which will be upgraded (e.g., upgraded with an upgraded program and/or data, such as application data and customization data). The shadow application server 110B may be hosted on a processor separate from the source application server 110A or one the same processor but using a directory that is separate from the source application server 110A.

At 220, adaptive switch installer 150 implements the upgrade at the shadow application server 110B rather than source application server 110A. For example, the adaptive switch installer 150 may clone tables at database 115A used by source application server 110A, create synonyms of the cloned tables (which are merely links to the cloned tables), and deploy portions of the upgrade to the synonyms of the cloned tables rather than copy all of the tables of a software upgrade package to the shadow system. The upgrade may include one or more of the following: a program (or component of a program) and data.

As noted, the program(s) and/or data of the software upgrade package may be configured in tables, such as a repository table, a customizing table, and an application data table. For example, repository tables may include the code being upgraded (e.g., ABAP reports, classes, deployment of dictionary (DDIC) definitions, data objects, runtime objects, ABAP loads, tables, and the like). A customizing table may include data configuring the business logic associated with the shadow application server 110B. Application data tables may include data entered by the users and created by the applications.

Moreover, the adaptive switch installer 150 may adjust, as part of the upgrade, data associated with the tables, such as a repository table, a customizing table, and an application data table. The adjustment may also include updating any data copied at 210 from the application data server 110A to the shadow application server 110B. For example, any changes that occurred to application tables at source application server 110A (which occurs after data is copied to shadow application server 110B) may be applied (e.g., migrated) to shadow application server 110B, so that the shadow application server 110B has a proper data state.

At 243, adaptive switch installer 150 performs a switch by ending the runtime of source application server 110A, switching the tables from the shadow system to the source system (e.g., by renaming the repository, customizing, and/or application tables to allow use by source application server 110A), and then restarting the source application server 110A to allow the renamed tables to be used at the source application server 110A.

The adaptive switch installer 150 may thus be used to reduce downtime associated with deploying an upgrade. To that end, adaptive switch installer 150 generally clones a table (e.g., named "table A") to create another table with a different name (e.g., creates a table named "table A_suffix") and during downtime deploys the delta upgrade software to "table A_suffix", drops the original table (e.g., "table A"), and renames the other table (e.g., "table A_suffix") to the original table name. Database 115A can process a drop table A, rename table A_suffix to table A relatively fast, when compared to copying data from table A_suffix to table A. Moreover, as database 115A typically cannot rename a schema, adaptive switch installer 150 may be used to create a schema (e.g., a schema identified as "SAP" including access to table A and table A_suffix in a databases called SAP.A and SAP.A_suffix). The adaptive switch installer 150 also creates a shadow schema (e.g., a schema identified as SAP_suffix), wherein the shadow schema include an alias A within schema SAP_suffix (e.g., in the database called SAP_suffix.A) which is simply a link to the content of SAP.A_suffix). As a rename of SAP_suffix.A to SAP.A is not typically possible, a copy of the content would be needed, although this copy would be very slow. Instead, adaptive switch installer uses a shadow table and another shadow schema with synonyms, which are renamed (e.g., rename SAP.A_suffix to SAP.A) to improve performance, when compared to copying the content.

Figure 3:
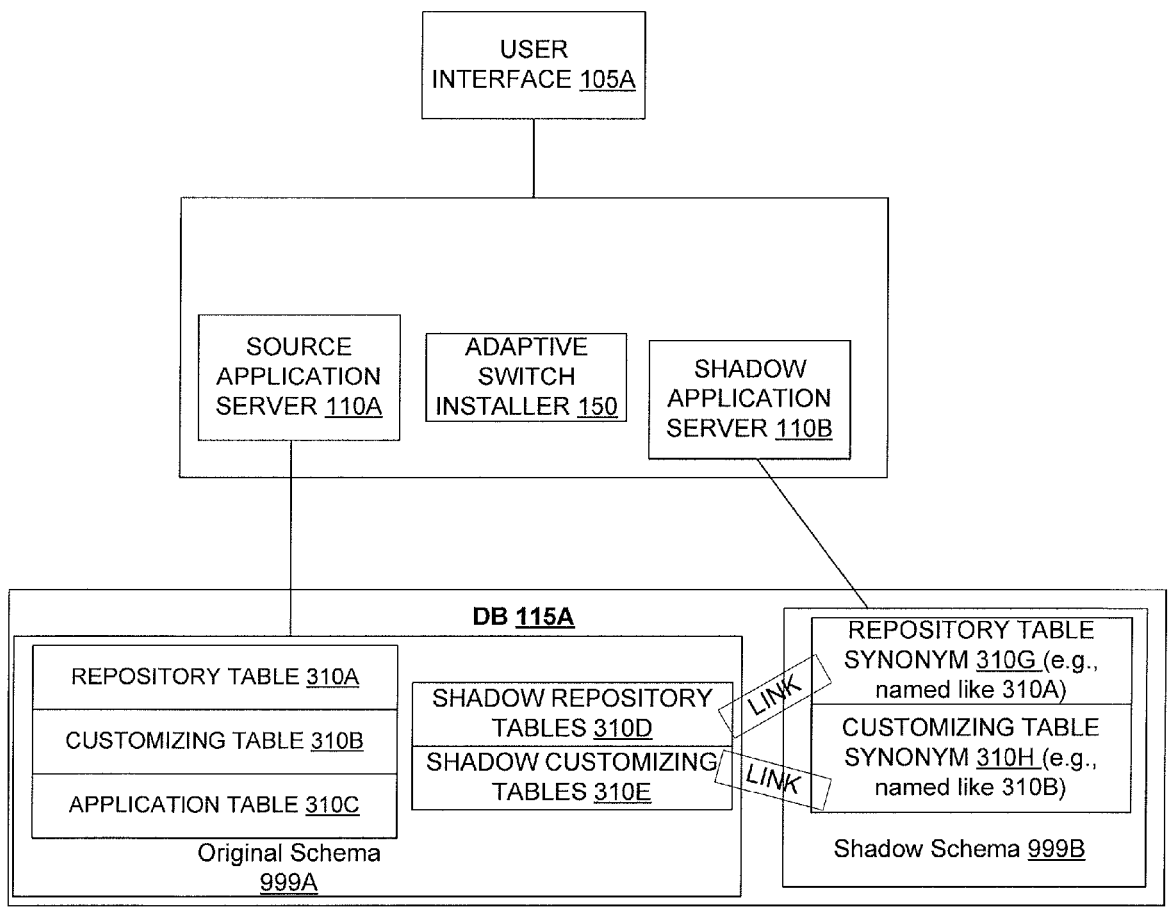
FIG. 3 depicts another system including tables used during a software update.

FIG. 3 depicts the system 100 of FIG. 1 after the shadow schema 999B is implemented and the synonyms are created (e.g., tables 310G-H). After the delta upgrade package is used to upgrade tables 310G-H (e.g., provide content to reconfigure structures of tables, and the like), the adaptive switch installer 150 may rename tables 310D to 310A and 310E to 310B, the tables 310D and 310E having received the content of the upgrade package deployed to the synonyms 310G and 310H (since the synonyms are only links to the tables 310D and 310E the content written to 310G is stored by the database in table 310D, the content written to synonym 310H is written to table 310E) The shadow system 110B is configured to connect to schema 999B, and read and update to synonyms 310G and 310H. In order to allow the access to the repository and configuration tables without re-configuring each table access in system 110B (but only one schema access), the synonyms 310G and 310H have the same name as tables 310A and 310B. The schema 999A and 999B can contain database objects (tables or synonyms) with an identical name (this way table 310A in schema 999A and table 310G in schema 999B can have the same name).

Figure 4A:
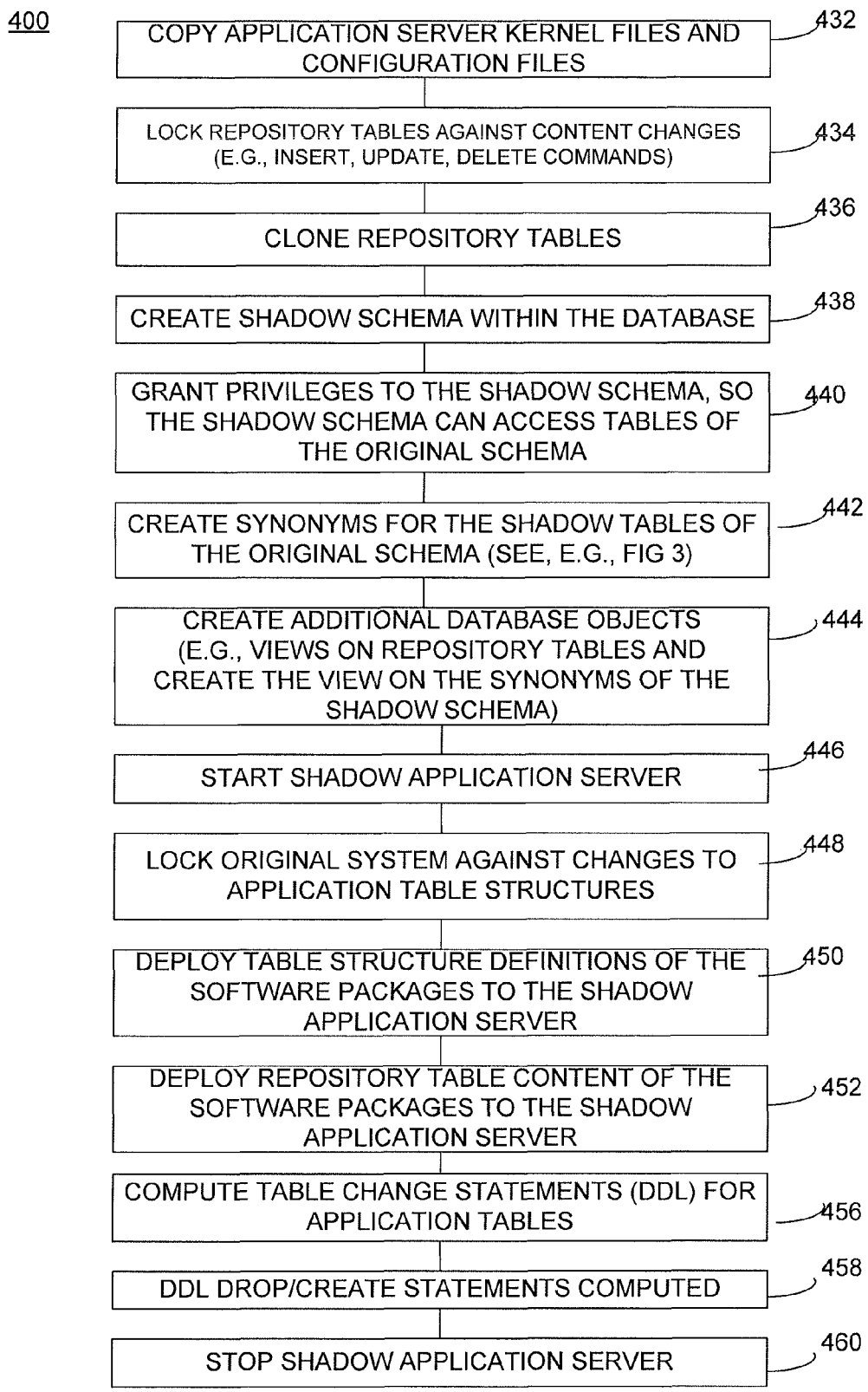
FIGS. 4A-4B illustrates another process for handling software updates.
Figure 4B:
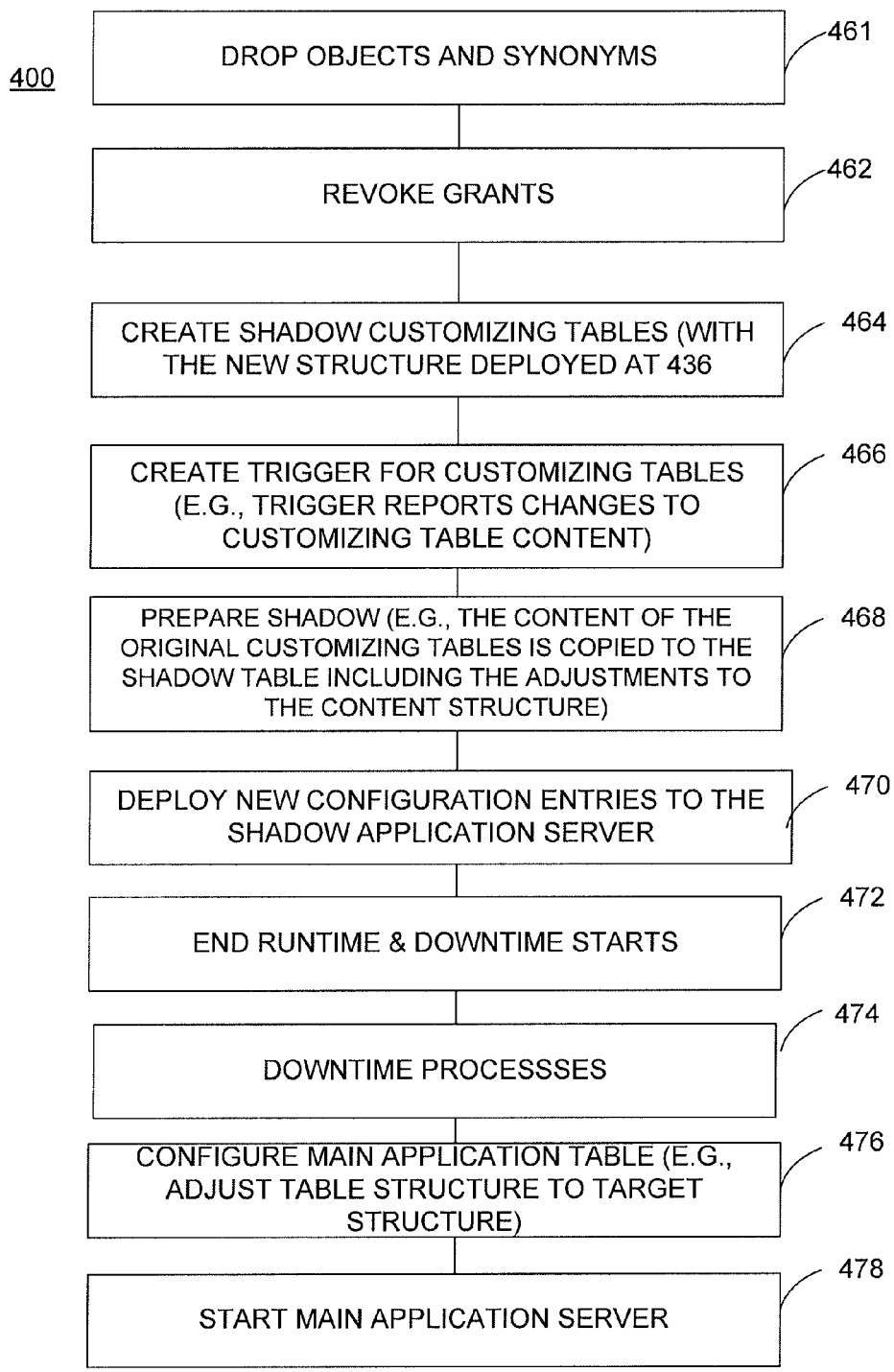

FIGS. 4A-4B depict another process 400 for upgrading an application server using adaptive switch installer 150. Process 400 is similar to process 100 in many respects but includes additional aspects as will become apparent below. The phrase "kernel program" refers to the application server program that runs on the operating system. The kernel program may have one or more associated configuration files used in configuring the kernel program. The description of process 400 also refers to FIG. 3.

The process 400 is described within the context of systems running an application server. The application server connects to a database, and executes programs stored in repository tables. The executed programs provided the upgrade of the application server. However, the upgrade is performed on a shadow application server rather than the source application server, which is in productive use. The executed programs (or applications) stored in the repository tables may also be configured by entries in the customizing tables. The executed programs (or applications) operate on data stored in the application tables.

At 432, adaptive switch installer 150 may copy the application server 110A (including kernel programs and configuration data) to a different directory than the source release. The copy is referred to as the shadow application server 110B. The source release (i.e., the source application server 110A) refers to the version of the software program currently in production, and the destination release refers to the version of the software that the user wants to run in the future after being upgraded (i.e., shadow application server 110B). Moreover, the destination release, which is the upgrade, is implemented so as not to affect the source release. For example, if ports are used, the port numbers used by the shadow application server 110B are different from the ports numbers used by the source application server 110A. Likewise, other operating system resources are implemented at the shadow application server 110B in a way that the source application server 110A is not affected. The shadow application server 110B is also configured to connect to the database 115A with an alternative user (referred to as a shadow database user) to avoid any impact to the source application system 110A, which is in productive use by a user.

At 434, adaptive switch installer 150 locks the source application server 110A. When locked, the source application server 110A is inhibited, so that the repository tables cannot be accessed to make a change, such as an insert, update, or delete. After the lock, no new programs or program changes may be installed at the source application server 110A.

At 434, adaptive switch installer 150 clones (i.e., copies) the repository and customizing tables of the source release in the productive database (i.e., repository and customizing tables being used by source application server 110A) for further use with the shadow application server 110B. FIG. 3 depicts the cloned tables 310D and E. The tables to be cloned are determined using the information shipped by, for example, an entity providing the software destination release (e.g., the vendor of a release or upgrade typically provides a list of the repository and customizing tables). The cloning mechanism may be implemented in ABAP (but can be done using other database techniques as well). The structure of a particular table is determined in two different ways depending on whether or not a table is known to a dictionary (e.g., an ABAP dictionary or other like repository storing structural information about tables in the system). For example, in the case of dictionary tables, standard ABAP system functions may be used to determine table structure (e.g., the ABAP function is independent of the underlying database vendor implementation; for other types of tables, a database dependent method may be used). The table structure information gathered in this way may then be used as input to a function for generating the corresponding "create table" statement. This create table statement is then further analyzed and adopted, so that the alternative names (i.e., shadow) names used for the table name, the primary index, and the table space. Next, the create table statement is executed to create the table. Next, the table data may then be copied from the original, source tables (e.g., the customizing and repository tables of source application server 110A) into the cloned table. Generally, this copying may be done using the following statement: INSERT INTO <CLONED TABLE> (<COLUMN LIST>) SELECT <COLUMN LIST> FROM <ORIGINAL TABLE>. But the method may be adopted for any given database. Moreover, the column list is determined using the table structure information in, for example, an ABAP system or in a database catalogue. Next, secondary indexes on the cloned table are created (if required). The structures of the secondary indexes are again determined depending on whether a table is known to a dictionary, such as the ABAP dictionary. Moreover, not all repository and customizing tables need be filled with data for the correct operation of the shadow application server 110B.

In some implementations, a feature of the above-described cloning mechanism is the ability to control whether or not a table should be copied together with data and secondary indexes using an external parameter file. This feature may significantly reduce the amount of data to be copied. In some implementations, another feature of the above-described cloning mechanism is that it allows cloning of tables in parallel with, for example, up to about 10 processes (which in some implementations is also restricted by the number of batch processes running on a system).

At 438, a shadow schema is created. FIG. 3 depicts the original schema 999A used by source application server 110A and the shadow schema 999B used by shadow application server 110B. The schema thus serves to associate a user with database objects and/or views.

At 440, adaptive switch installer 150 grants privileges to the shadow schema 999B. The grant of privileges enables the shadow schema 999B to access (e.g., read, write, and the like) the tables and views of the original schema 999A database 115A. For example, the original schema 999A (which may be named SAPDB) may own a table, which may be named TABLE~. Now to the shadow schema 999B (which may be named SAPDBSHD), an access permission to a table, such as SAPDB.TABLE~, may be granted. Shadow schema SAPDB-SHD can access the content of table SAPDB.TABLE~, which is owned by original schema, SAPDB, and with further privileges can also read out the database catalogue entries of SAPDB.TABLE~, which describes the type and structure of the database object.

At 442, adaptive switch installer 150 creates synonyms for the shadow tables of the original schema 999A. For example, shadow repository tables 310D and shadow customizing tables 310E of original schema 999A are created. The synonyms 310G and 310H of shadow schema 999B are created, synonym 310G is created as link to shadow repository table 310D of schema 999A, synonym 310H is created as link to shadow customizing tables 310E are depicted at FIG. 3. A synonym refers to a database object, which can link to another database object, such as tables, views, sequences, stored procedures, and others. For example, the created synonyms of a shadow schema 999B have names without an extension to enable access to the tables of the shadow application server 110B, while the tables 310D and 310E of original schema 999A have names with an extension to enable access under the main database user to database 115A and at the same time separate the tables from the tables used by the productive system 310A, 310B and 310C. The original schema 999A for the original, source application server 110A may be called, for example, "SAPDB," while the shadow schema 999B of the shadow application server 110B schema is referred to as, for example, "SAPDBSHD." In this example, the original, source tables (e.g., repository and customizing table being used by source application server 110A) are in schema SAPDB and are called, for example, "TABLE". Moreover, the shadow tables reside in schema SAPDB and have names "TABLE~". The synonyms reside in schema SAPDBSHD, are called "TABLE", and refer to "SAPDB.TABLE~." A select to the synonym SAPDBSHD.TABLE provides the entries in SAPDB.TABLE~.

The phrase "database user" may refer to a database user, a database schema, and/or a database. The "database user" or "DB schema" is an entity that defines its own namespace for database objects. Different "database users" may have the same objects. For example, a user, for example SAPDB, can have an object called TABLE, and another user, for example SAPDBSHD, can have also an object TABLE. The objects SAPDBSHD.TABLE and SAPDB.TABLE may be completely different (even have different database object types). Different database vendors may use different mechanisms to enable creating objects with identical names, which are still considered different. In any case, each database user may have its own namespace, although different database users may have tables with the same name.

At 444, adaptive switch installer 150 creates additional database objects. Specifically, adaptive switch installer 150 may create views on repository tables 310D and create the view on the synonym, i.e., repository table 310G. For example, the non-data database objects may include views, sequences, triggers, aliases, and synonyms. The views, triggers, and aliases are referred to using the synonyms created at 442. Stored procedures (which are needed by the source application server 110B to run) may be imported into the shadow application server 110B and database 115. For example, a select to a table, such as TABLE, provides the entries of SAPDB.TABLE (e.g., the default schema may be defined upon the connect). A connect to schema SAPDBSHD will provide, via a select to TABLE, the entries which synonym SAPDBSHD.TABLE would provide (which are the entries of SAPDB.TABLE~).

At 446, adaptive switch installer 150 starts the shadow application server 110B. Once the shadow application server 110B is connected to the database 115A using the shadow database user, the programs in the shadow application server 110B can be called to initiate a start. The programs (which represent the upgrade) are stored in the shadow repository tables and are configured with the shadow customizing tables.

At 448, adaptive switch installer 150 locks the source application server 110A to prevent changes to the structure of the application tables (e.g. tables 310C in FIG. 3). Once the shadow application server 110B computes the target table structure, and then computes the table change statements required to transform the original table structure into the target table structure.

At 450, table structure definitions are deployed. The table structure definitions are deployed from the delta software upgrade package to shadow application server 110B. For example, the table structure definitions of the delta upgrade package is deployed to (i.e., configured on) the tables 310G-H cloned (e.g., copied) to the shadow application server. The structure definition is imported into the shadow repository tables 310D-E. Next, programs can use this table definition to compare the current table structure (e.g., read from the database catalog) with the target structure and compute the mechanism to adjust to the new structure of the shadow tables. For example, a database statement, such as DDL (data definition language), may be used to adjust the new structure. A conversion may be used to create a new table with the target structure, copy the data, drop original and rename the new table. Once the upgrade is complete, the original repository tables and customizing tables used by the source application server are switched (e.g., replaced) with the synonyms of the repository tables and customizing tables.

At 452, repository table content of the delta software upgrade package is deployed to the shadow application server. For example, the content of the repository tables (which is included in the delta upgrade package) is deployed to the shadow application server 110B. Specifically, this repository table content may include one or more of programs, classes, functions, user interfaces, and the like. The shadow application server reads the content from the database tables and then executes them. A repository change may only happen upon deployment of new software (or a new software version) to the application server.

At 456, adaptive switch installer 150 determines table change statements (e.g., using a DDL) for the application tables. For example, a determination is made regarding which application tables need to be converted from the delta upgrade package. When this is the case, the new structure is realized by creating a new application table and copying data into that new application table, while converting the field entries to the new application table structure.

At 458, adaptive switch installer 150 executes DDL drop/create statements for shadow customizing tables. For example, DDL statements are calculated to recreate objects that refer to tables that are switched, even when the tables do not change from the source application server 110A to the shadow application server 110B, i.e., the destination release.

At 460, adaptive switch installer 150 stops the shadow application server 110B. For example, stopping an application server can be done using a service provided by the application server. The command stop notifies the application server and stops operation in a controlled manner (e.g., open transactions are terminated, users logged on are logged out, batch operation is stopped, and processes are terminated).

At 461, adaptive switch installer 150 drops (i.e., removes, deletes, and the like) any objects created at 444. Moreover, adaptive switch installer 150 may drop synonyms created for the shadow database user during 442 (i.e., create synonym).

At 462, adaptive switch installer 150 revokes grants given to the shadow database user connected to the shadow application server and database during 440 (i.e., grant privileges).

At 464, adaptive switch installer 150 creates shadow customizing tables and application tables with the structure consistent with the final destination release structure. For example, the table, such as SAPDB.TABLE, may receive a considerable number of entries during the upgrade. The upgrade creates a shadow table, such as SAPDB.TABLE~. This shadow table allows copying of entries from table, such as TABLE, and allows an import of the entries of the new release into another table, such as TABLE~ during uptime. To ensure, no changes to the table named TABLE are lost, triggers have to be created to detect changes to that table after the entries have been copied to table named TABLE~.

At 466, adaptive switch installer 150 creates triggers. Triggers are created on the main customizing tables associated with the source application server. These triggers need to report any change in the content of any of the customizing tables 310E. The trigger adjusts the content of the corresponding shadow customizing table according to the change in the main customizing table. If an entry in table "A" (which is associated with the source application server) has been inserted or updated or deleted, the trigger inserts, updates or deletes the corresponding entry in table "A~" (which is associated with the shadow application server).

At 468, adaptive switch installer 150 prepares the shadow application server 110B. For example, the data from the main customizing table 310B (which is associated with source application server) is copied to the shadow customizing table 310E. Moreover, the copying adapts the content of the tables to the structure of the shadow customizing table 310E.

At 470, the new configuration entries are deployed to the shadow application server. In addition, the new configuration entries to the shadow application server may be deployed at the shadow application server. The configuration entries are stored in database tables as well. The programs read the configuration to switch the behavior. The configuration is updated upon a change in the application scope or the application behavior. A change may seldom be compared to changes in application data tables.

At 472, adaptive switch installer 150 stops the runtime of the productive source application server 110A. Specifically, the productive source application server 110A is shutdown. This may be considered the start of the downtime of source application server 110A.

At 474, adaptive switch installer 150 begins downtime processing. The downtime processing may include one or more of the following. The triggers may be dropped, i.e., all the triggers created during 466 (create triggers) are dropped. If a trigger strategy is implemented, table content changes are reported, and trigger results are evaluated. At the source application server 110A, the main source repository tables 310A and the main source customizing tables 310B are dropped. Next, the shadow repository tables 310G and the shadow customizing tables 310H are renamed to the original name of the dropped main source repository tables 310A and the main source customizing tables 310B. For example, a table, such as the table named SAPDB.TABLE, is now obsolete, and the table SAPDB.TABLE~ is the target table (e.g., the statements used at this point are dropped SAPDB.TABLE and rename table SAPDB.TABLE~ to SAPDB.TABLE).

At the source application server 110A, the main kernel programs are replaced by the destination release versions of the shadow application server, and the main configuration files are adapted to the destination release features. All stored procedures needed by the source application server are replaced and/or imported. The new version of the procedure is used upon re-start of the source application server 110A. The statements computed during 458 (calculate DDL drop/create statements) are executed. The main application tables are adjusted to the destination release structure. Any database objects remaining, such as views, triggers, and synonyms, which have not yet been adjusted, are adjusted. Next, additional table entries may be imported. At this point, all tables now have the final structure, additional table entries can be imported (i.e. if they have not been imported previously).

At 476, adaptive switch installer 150 configures the main application table structure to the target structure of the delta upgrade package. For example, adaptive switch installer 150 alters the structure of the source application table(s) using DDL statements to modify the application tables to conform to the structure of the destination release, i.e., the delta upgrade package. For example, a table, such as TABLE of the original (old) release, may include the fields F1 and F2; field F2 is a character field with length 10. For the new release, the table, such as TABLE, has another field F3, and the field F2 is a length 20. In this example, the table has to be adjusted to the new structure (e.g., field F2 has to be made longer and field F3 has to be added with the correct type and length). A DDL statement is the database command, which can be used to change field length and add new fields. (e.g., "alter TABLE by adding field F3 type X"). The database table catalogue may be accessed to enable the adaptation of the application table structure. Specifically, adaptive switch installer 150 may use (e.g., connect to) the table definition of the main database user rather than the user of the shadow application server.

At 474, the main application server 110A may be started again. The application server 110A is now using the destination release and is ready for productive operation again.

Although the above process is described using triggers, the process may also be run without the use of triggers. When that is the case, a shadow customizing table is not created. The triggers on the original customizing tables can be omitted. The data then needs to be imported during downtime, after adaptations of the structure.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" may refer to any entity including a person or a computer. As used herein a "set" can refer to zero or more items.

The foregoing description is intended to illustrate but not to limit the scope of the invention, which is defined by the scope of the appended claims. Other embodiments are within the scope of the following claims.

What is claimed:

1. A non-transitory computer-readable medium containing instructions to configure a processor to perform a method, the method comprising:
    copying a source application server to form a shadow application server, the copying including copying a repository table and a customizing table to form a shadow repository table and a shadow customizing table;
    implementing an upgrade at the shadow application server, the upgrade including table structure definitions for the customizing table and at least one application table, a content for the repository table, and content for the customizing table, the upgrade applied to a first synonym of the shadow repository table and a second synonym of the shadow customizing table, the first synonym enables the shadow application server to connect to the shadow repository table, when the upgrade is being implemented, and the second synonym enables the shadow application server to connect to the shadow customizing table, when the upgrade is being implemented, wherein only a portion of the upgrade is deployed to the first and second synonyms and only a portion of tables in the upgrade is copied to the shadow application server; and
    switching to the upgrade by renaming the shadow repository table and the shadow customizing table to identifiers corresponding to the repository table and customizing table of the source application server.

2. The computer-readable medium of claim 1 further comprising:
    copying the repository table and the customizing table within a first schema to form the shadow repository table and the shadow customizing table.

3. The computer-readable medium of claim 2 further comprising:
    creating, in a second schema, the first and second synonyms, the second schema configured to be accessed by the shadow application server and to access the shadow repository table and the shadow customizing table.

4. The computer-readable medium of claim 1, wherein the source application server is on a processor separate from the shadow application server.

5. The computer-readable medium of claim 1, wherein copying further comprises:
    copying the repository table and the customizing table to the shadow application server, the repository table including program code being upgraded, and the customizing table including data configuring business logic associated with the shadow application server.

6. The computer-readable medium of claim 1, wherein switching further comprises:
    stopping the source application server by terminating a runtime process of the source application server, dropping, at the source application server, a source repository table and a source customizing table, and renaming, at the shadow application server, the repository table and the customizing table.

7. A computer-implemented method comprising:
    copying a source application server to form a shadow application server, the copying including copying a repository table and a customizing table to form a shadow repository table and a shadow customizing table;
    implementing an upgrade at the shadow application server, the upgrade including table structure definitions for the customizing table and at least one application table, a content for the repository table, and content for the customizing table, the upgrade applied to a first synonym of the shadow repository table and a second synonym of the shadow customizing table, the first synonym enables the shadow application server to connect to the shadow repository table, when the upgrade is being implemented, and the second synonym enables the shadow application server to connect to the shadow customizing table, when the upgrade is being implemented, wherein only a portion of the upgrade is deployed to the first and second synonyms and only a portion of tables in the upgrade is copied to the shadow application server; and
    switching to the upgrade by renaming the shadow repository table and the shadow customizing table to identifiers corresponding to the repository table and customizing table of the source application server.

8. The computer-implemented method of claim 7 further comprising:
    copying the repository table and the customizing table within a first schema to form the shadow repository table and the shadow customizing table.

9. The computer-implemented method of claim 8 further comprising:
    creating, in a second schema, the first and second synonyms, the second schema configured to be accessed by the shadow application server and to access the shadow repository table and the shadow customizing table.

10. The computer-implemented method of claim 7, wherein the source application server is on a processor separate from the shadow application server.

11. The computer-implemented method of claim 7, wherein copying further comprises:
    copying the repository table and the customizing table to the shadow application server, the repository table including program code being upgraded, and the customizing table including data configuring business logic associated with the shadow application server.

12. The computer-implemented method of claim 7, wherein switching further comprises:
stopping the source application server by terminating a runtime process of the source application server, dropping, at the source application server, a source repository table and a source customizing table, and renaming, at the shadow application server, the repository table and the customizing table.

13. A system comprising:
a processor; and
a memory, wherein the processor and the memory are configured to perform a method comprising:
copying a source application server to form a shadow application server, the copying including copying a repository table and a customizing table to form a shadow repository table and a shadow customizing table;
implementing an upgrade at the shadow application server, the upgrade including table structure definitions for the customizing table and at least one application table, a content for the repository table, and content for the customizing table, the upgrade applied to a first synonym of the shadow repository table and a second synonym of the shadow customizing table, the first synonym enables the shadow application server to connect to the shadow repository table, when the upgrade is being implemented, and the second synonym enables the shadow application server to connect to the shadow customizing table, when the upgrade is being implemented, wherein only a portion of the upgrade is deployed to the first and second synonyms and only a portion of tables in the upgrade is copied to the shadow application server; and
switching to the upgrade by renaming the shadow repository table and the shadow customizing table to identifiers corresponding to the repository table and customizing table of the source application server.

14. The system of claim 13 further comprising:
copying the repository table and the customizing table within a first schema to form the shadow repository table and the shadow customizing table.

15. The system of claim 14 further comprising:
creating, in a second schema, the first and second synonyms, the second schema configured to be accessed by the shadow application server and to access the shadow repository table and the shadow customizing table.

16. The system of claim 13, wherein the source application server is on a processor separate from the shadow application server.

17. The system of claim 13, wherein copying further comprises:
copying the repository table and the customizing table to the shadow application server, the repository table including program code being upgraded, and the customizing table including data configuring business logic associated with the shadow application server.

18. The system of claim 13, wherein switching further comprises:
stopping the source application server by terminating a runtime process of the source application server, dropping, at the source application server, a source repository table and a source customizing table, and renaming, at the shadow application server, the repository table and the customizing table.

* * * * *